Dec. 14, 1954  YVES LE SECH  2,696,662
MEMBER TO BE USED IN THERMIC ENGINES
Filed Oct. 26, 1948

INVENTOR
Yves Le Sech

By Watson, Cole, Grindle & Watson

Patent 2,696,662

2,696,662
MEMBER TO BE USED IN THERMIC ENGINES

Yves Le Sech, Paris, France, assignor to Societe Nationale d'Etude et de Construction de Moteurs d'Aviation, Paris, France, a company of France Application October 26, 1948, Serial No. 56,613

Claims priority, application France October 27, 1947

4 Claims. (Cl. 29—195)

It is a known fact that metals may be coated with one or more layers of enamel to protect them against corrosion. Such a coat however shows interest only in the case of objects that are not subjected to excessive mechanical straining because the enamel coat shows only a poor resistance to such a straining.

It is also known that glass or ceramic ware may be coated with metal but heretofore such coatings have been effected for various purposes such as the obtention of a decorative or reflecting or electro-conductive layer, but it has not been attempted through such means to obtain a suitable degree of resistance in members subjected both to thermic and mechanical strains.

It is also known that the drawback met with heretofore in the industrial development of certain turbo-engines operating at high temperature, such as for instance gas turbines, consists in the absence of any available material capable of resisting without any substantial deformation, mechanical stresses, when subjected to high temperature.

The present invention has for its object heat engine members made of a plurality of common materials which individually may not provide all the required features, but which, in association, are liable to stand satisfactorily mechanical strains at high temperatures. According to the invention, the member is constituted by a core made of a convenient metal or alloy which may be refractory, and coated with at least one layer of enamel, itself coated with one layer of metal, the layers being alternately disposed and adhering to each other.

The number of layers may be a variable one according to the applications to be considered for the member made therewith and the constitution of the core; also variable according to the applications considered, so that it is possible to finish with a layer either of metal or enamel. For instance, the last layer may be of metal in the case of a turbine blade and of enamel in the case of a combustion chamber. The main layers may also be associated with suitable intermediate layers in order to improve their adherence.

It has been stated hereinabove that the nature of the core may vary according to the intended purpose of the member. For instance, for the rotor blades of a gas turbine that is subjected, as well known, not only to high temperatures but also to considerable mechanical stresses by reason in particular of the action of centrifugal force or else in the case of valves for heat engines that are also exposed to high strain, it is convenient to make the core of one of the metals or alloys now known which are creep-resistant and refractory, i. e. the physical and mechanical properties of which remain to a large extent unaltered at high temperatures. On the other hand, in the case of stationary combustion chambers and gas pipes, the mechanical straining being far less important, it is possible, according to the temperature of the gases, to resort for the formation of the core either to refractory metals or to non-refractory metals or even to light metals.

In the specification and sub-joined claims, the term "refractory metal" means any metal or alloy resisting fusion, distortion and chemical action when subjected to high temperatures such as may be obtained with combustion gases in jet engines.

The layers of enamel should be selected so as to increase the refractory properties of the member and in its turn the metal laid over the enamel should be selected by reason both of its refractory character and of its mechanical resistance. Any metal and enamel which may be termed refractory can be used, as far as their physical and chemical properties are suitable for the formation of layers which are in closely adhering relation to one another.

The word "enamel" should be considered in its broader meaning and although this word is distinguished, in the specification and sub-joined claims from the word "metal," it will be construed to include the presence of free or combined metal ions inside the body of the enamel, as it is a known fact that numerous enamels contain some metal and for a proper form of the invention, it is often of interest to incorporate to the enamel metallic ions that are similar to those of the core or of the metallic layers, in order to provide for proper adherence.

The word "enamel" is taken as meaning either a compounding of enamel for glassmaking, metals, varnishes or ceramics, or a compounding for pottery paste, or still a mixture of both these compoundings which may further be supplied with certain substances before or after roasting, before or after melting.

As concerns the metal layers, it is possible to mention by way of example and by no means in a limiting sense as basic metals: iron, chromium, nickel, cobalt, platinum and the like refractory metals to be used either pure or as alloys with one another or with other metals or again in combination with non-metals. All these metals have melting points which range substantially above 1000° C.

A member, according to the invention, leads to the following advantages:

(i) The core retains when cold and up to temperatures that depend on the nature of the metal or alloy used for its constitution, the mechanical properties of metals such as high tensile strength, elasticity, etc.

(ii) The coating hinders the transfer of heat into the body of the member as the layer of enamel is heat insulating and the layer of metal covering it has a reflecting surface.

(iii) The resistance to creep is increased as each layer exerts a skin effect on the underlying layer. The resistance to creep afforded by the compound member is thus more considerable than that of the metal forming the core. The resistance to corrosion is increased by the layer or layers of a refractory enamel that is chemically stable while the mechanical properties of each layer of enamel are also improved by the metal layers covering it.

(iv) It is not necessary to polish the surface of the core, the desirable polish being obtained automatically by the coating. It is thus possible to avoid a machining operation that is difficult to perform and is costly.

(v) Lastly, the coating may provide other physicochemical properties according to the nature of the material forming it.

The layers may have a thickness that is uniform or otherwise.

The coating modifies to a more or less important extent the size of the member and this fact must be taken into account when machining the original metal core.

The adhesion of the metal and enamel layers and more particularly the adhesion of the first layer to the metal core may be provided by a suitable selection of the chemical composition of the layers. For instance, a core made of a cobalt containing alloy may be covered by an enamel containing cobalt oxide or aluminate, the diffusion of the cobalt ions between the enamel layer and the metal ensuring adherence. In certain cases, it is possible to superpose several different layers of enamel and metal so as to ensure aherence between each layer and the next one, if the last layer and the core to be coated do not show a sufficient possibility of direct adherence with one another.

The enamel layers may be spread with a brush or obtained by spraying or else by blowing as powder or by printing for instance through lithographic methods, in particular on a collodion support, or else through any other means used in ceramic, glass or enamel industries.

The metal layers may be laid through metallisation, through electrolysis, through chemical displacement and the like.

The layers may be subjected after their deposit to treatments adapted to improve them, for instance to thermic treatments.

Accompanying drawings shown by way of example and by no means in a limiting sense illustrate three embodiments of the invention. In said drawings.

Figure 1:
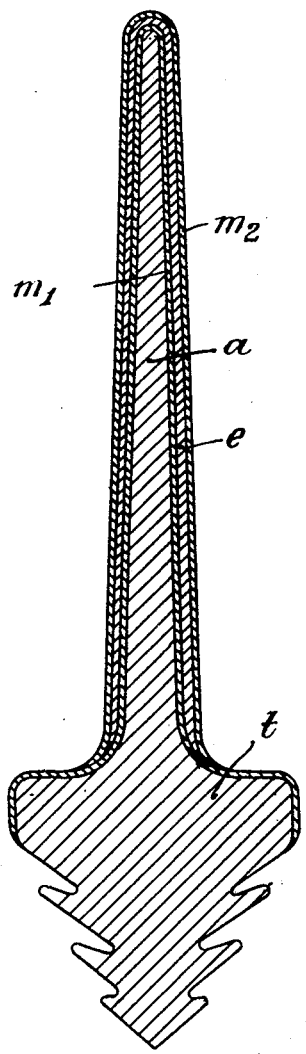
Fig. 1 is a radial cross section through a blade adapted to be mounted on a wheel of a gas turbine.

The blade illustrated in Fig. 1 includes a core $a$ of highly refractory alloy showing a high resistance to creep such as nickel-chromium austenitic steel. This core $a$ is covered by a metal coating $m_1$ of nickel deposited electrolytically after a superficial treatment of the core. The layer $m_1$ is then covered by a layer $e$ of a zirconium oxide enamel incorporating further refractory oxides such as molybdenum oxide, vanadium oxide, tungsten oxide and the like. This layer is formed through atomization. It is baked a first time, then superficially glazed with an enamel of same composition with the omission however of the refractory oxides.

The adherence of the layer $e$ to the nickel forming the layer $m_1$ may be improved by spraying at the very beginning of atomization enamel frit crushed without any refractory oxide in it but with the incorporation of nickel and bismuth ions.

Lastly the layer $e$ is covered by a layer $m_2$ of chromium deposited electrolytically after providing for bonding between the latter metal coating and the layer $e$. This bonding may be obtained through the cementation of the enamel of the layer $e$ by means of a liquid suspension of a chromium salt that is easily decomposable by heat, said suspension being spread with a brush over the enamel and then brought to a temperature that is lower than the softening point of the glazing layer of the enamel.

It will be noticed that in proximity with the tail end $t$ of the blade designed for securing the latter to the rotor, layer $m_2$ engages directly the core $a$ so as to form a sheath enclosing the enamel layer and also a closed heat conductive circuit which is of advantage for exhausting towards the mass of the rotor the heat accumulated in the metal layer.

Figure 2:
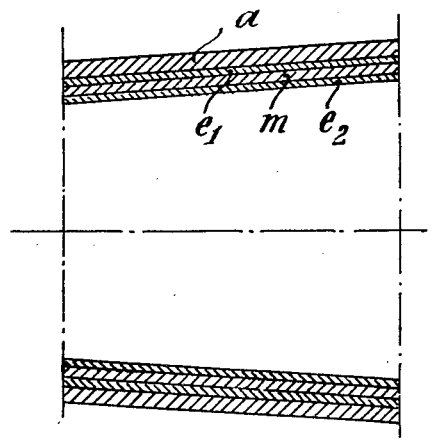
Figs. 2 and 3 are axial cross sections of a part of a combustion chamber and of a part of a hot gas pipe.

The combustion chamber illustrated in fragmentary cross section in Fig. 2 includes a core or support of tubular shape $a$ that is made of a nonrefractory metal such as soft iron, copper or the like. Said core is coated inwardly with a layer $e_1$ of zirconium enamel that shows only reduced refractory properties and then with a layer $m$ of a refractory metal such as nickel, cobalt and chromium and lastly with a layer $e_2$ of highly refractory enamel that may also be constituted by zirconium enamel, laden however with a larger amount of refractory oxides.

Figure 3:
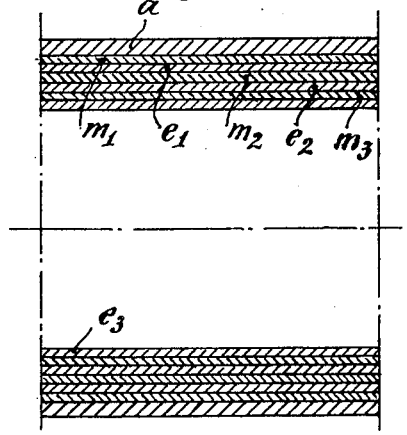

The hot gas pipe illustrated fragmentarily in cross section in Fig. 3 includes a core or support $a$ that according to the temperature of the gases conveyed therein may be made of a refractory metal or alloy, of a nonrefractory metal or even of a light metal. Inwardly, the core $a$ is coated with a layer $m_1$ of nickel, coated in its turn with a layer $e_1$ of zirconium enamel coated in its turn with a layer of nickel $m_2$ and so on. The layers of enamel are more and more laden with refractory oxide as they are considered nearer the axis of the pipe and the final layer is an enamel layer. The connection between each enamel layer and the nickel layer preceding it on the one hand and the following nickel layer on the other hand is ensured through cementation, the salt used for such a cementation in the example disclosed being a nickel salt.

It is possible to provide if required a direct metallic connection between the main metal layers and the core that is also made of metal as in the case of Fig. 1.

Obviously the embodiment that has been disclosed by way of example may be modified in various manners through substitution of technical equivalent means without widening thereby the scope of the invention as defined in accompanying claims.

The invention covers members obtained as hereinabove described and including blades for heat turbines, wheel discs, stationary or movable nozzles, combustion chambers, pipes, valves and cylinders for heat engines, and also the heat engines provided with members as disclosed.

What I claim is:

1. A heat engine element designed to be in contact with high temperature combustion gases, comprising a metal base coated with a layer of heat-insulating enamel closely adhering to said base through a bond of ionically-diffused material and over-coated with a layer of refractory metal closely adhering to said enamel layer through a bond of ionically-diffused material, said enamel being laden with ions of metal similar to that of the adjacent metal layers to promote ionic diffusion, whereby said base and said layers form together a single solid, integral element.

2. An element as recited in claim 1, wherein the metal base comprises a metal core coated with a layer of a metal different from that of said core and adapted to promote adhesion with said enamel layer through a bond of ionically-diffused material.

3. An element as recited in claim 1, comprising a plurality of metal and enamel layers alternately disposed over said metal base and closely adhering to each other through bonds of ionically-diffused material.

4. An element as recited in claim 3, wherein the enamel layers are increasingly laden with refractory oxides, the farther they are from the metal base.

References Cited in the file of this patent

UNITED STATES PATENTS

| Number | Name | Date |
|---|---|---|
| 776,518 | Junggren | Dec. 6, 1904 |
| 847,881 | Baumgarn | Mar. 19, 1907 |
| 1,952,705 | Egloff et al. | Mar. 27, 1934 |
| 2,073,334 | Coffman | Mar. 9, 1937 |
| 2,154,261 | Brandt | Apr. 11, 1939 |
| 2,188,399 | Bieber | Jan. 30, 1940 |
| 2,267,361 | Andrus | Dec. 23, 1941 |
| 2,304,259 | Karrer | Dec. 8, 1942 |
| 2,310,002 | Van Geel | Feb. 2, 1943 |
| 2,311,039 | Emery | Feb. 16, 1943 |
| 2,428,526 | Osterheld | Oct. 7, 1947 |
| 2,438,013 | Tanner | Mar. 16, 1948 |
| 2,464,141 | Maier | Mar. 8, 1949 |
| 2,495,762 | Porter | Jan. 31, 1950 |
| 2,495,835 | Comstock | Jan. 31, 1950 |
| 2,581,252 | Goetzel | Jan. 1, 1952 |

FOREIGN PATENTS

| Number | Country | Date |
|---|---|---|
| 381,102 | Great Britain | Sept. 29, 1932 |
| 432,386 | Great Britain | July 25, 1935 |